Sept. 15, 1925. Re. 16,165

W. LUMLEY

LIGHTING FIXTURE

Original Filed Dec. 16, 1921 4 Sheets-Sheet 1

INVENTOR,
Wilfrid Lumley
Kerr, Hudson & Kent
attys.

Sept. 15, 1925. Re. 16,165

W. LUMLEY

LIGHTING FIXTURE

Original Filed Dec. 16, 1921 4 Sheets-Sheet 2.

INVENTOR,
Wilfrid Lumley.
Lewis Hudson & Kent
attys.

Sept. 15, 1925. Re. 16,165

W. LUMLEY

LIGHTING FIXTURE

Original Filed Dec. 16, 1921 4 Sheets-Sheet 3.

INVENTOR,
Wilfrid Lumley
Kwis. Hudson + Kent
attys.

Sept. 15, 1925. Re. 16,165

W. LUMLEY

LIGHTING FIXTURE

Original Filed Dec. 16, 1921 4 Sheets-Sheet 4

INVENTOR,
Wilfrid Lumley.
Kerr Hudson & Kent
attys

Reissued Sept. 15, 1925. Re. 16,165

UNITED STATES PATENT OFFICE.

WILFRID LUMLEY, OF CONNEAUT, OHIO.

LIGHTING FIXTURE.

Original No. 1,522,732, dated January 13, 1925, Serial No. 522,757, filed December 16, 1921. Application for reissue filed March 28, 1925. Serial No. 19,181.

*To all whom it may concern:*

Be it known that I, WILFRID LUMLEY, a citizen of the United States, residing at Conneaut, in the county of Ashtabula and State of Ohio, have invented certain new and useful Improvements in Lighting Fixtures, of which the following is a specification.

This invention relates to a lamp fixture, and has for its chief object to provide a fixture of the indirect lighting type which is highly efficient in its light transmitting and diffusing qualities, and is ornamental in appearance. It is the chief characteristic of this fixture that there is associated with the frame or holder and a plurality of lamps, such as incandescent lamps, a plurality of inverted light reflecting members each individual to a lamp.

The present invention embodies certain features of construction and arrangement which improve the effectiveness and utility of the lamp fixture and the invention may be briefly summarized as consisting in certain novel details of construction, and combinations and arrangements of parts which will be described in the specification and pointed out in the appended claims.

Figure 1:
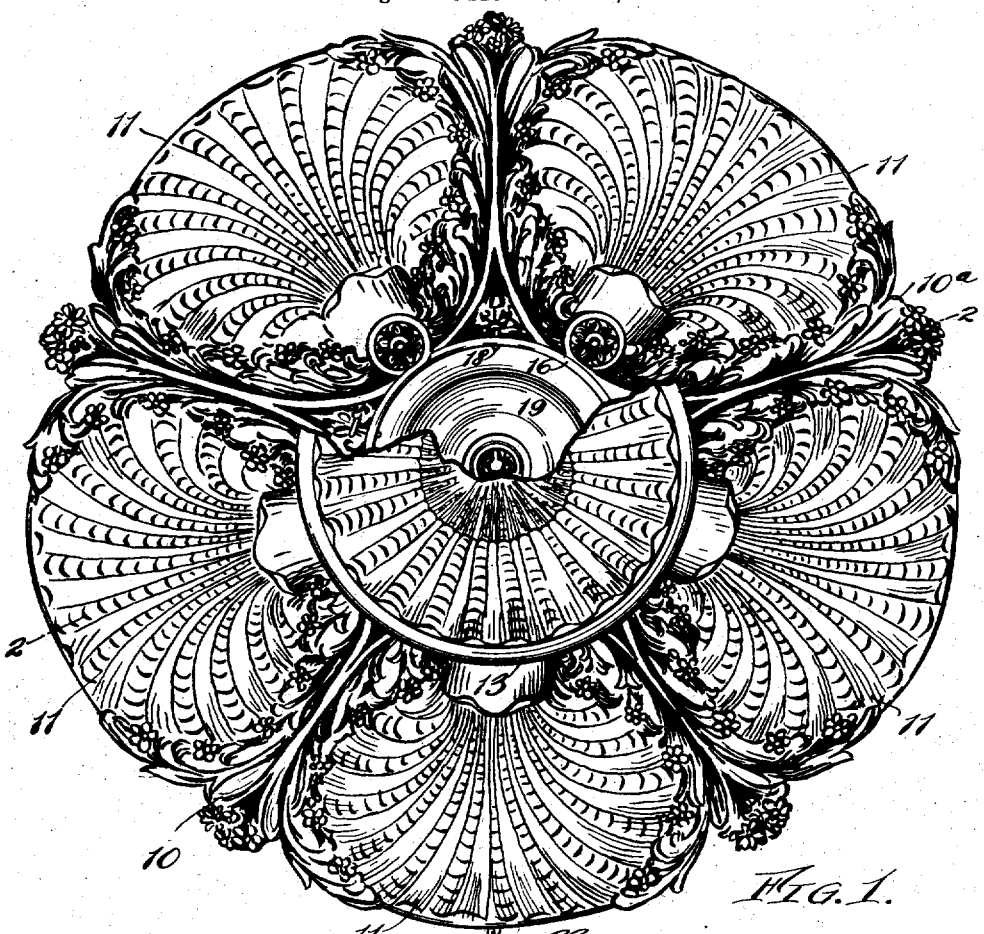
Figure 2:
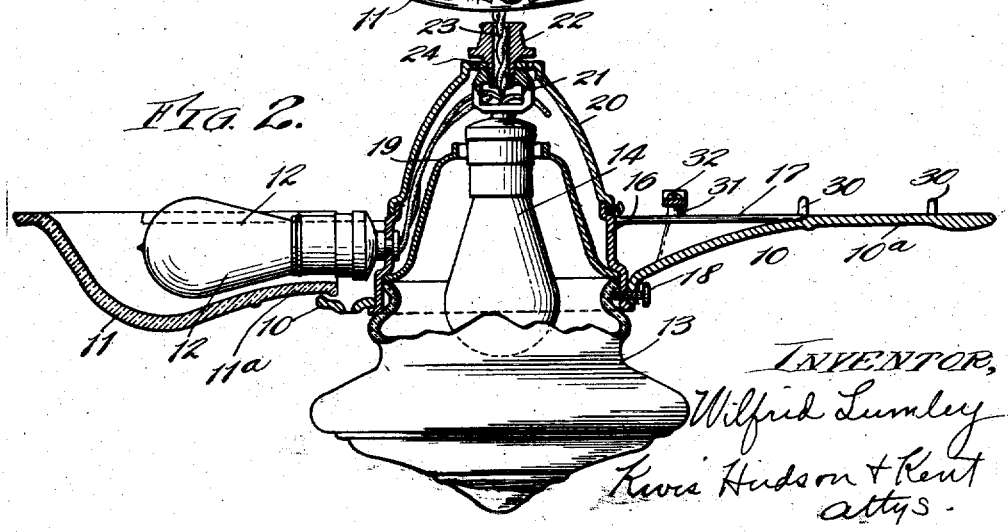
Figure 3:
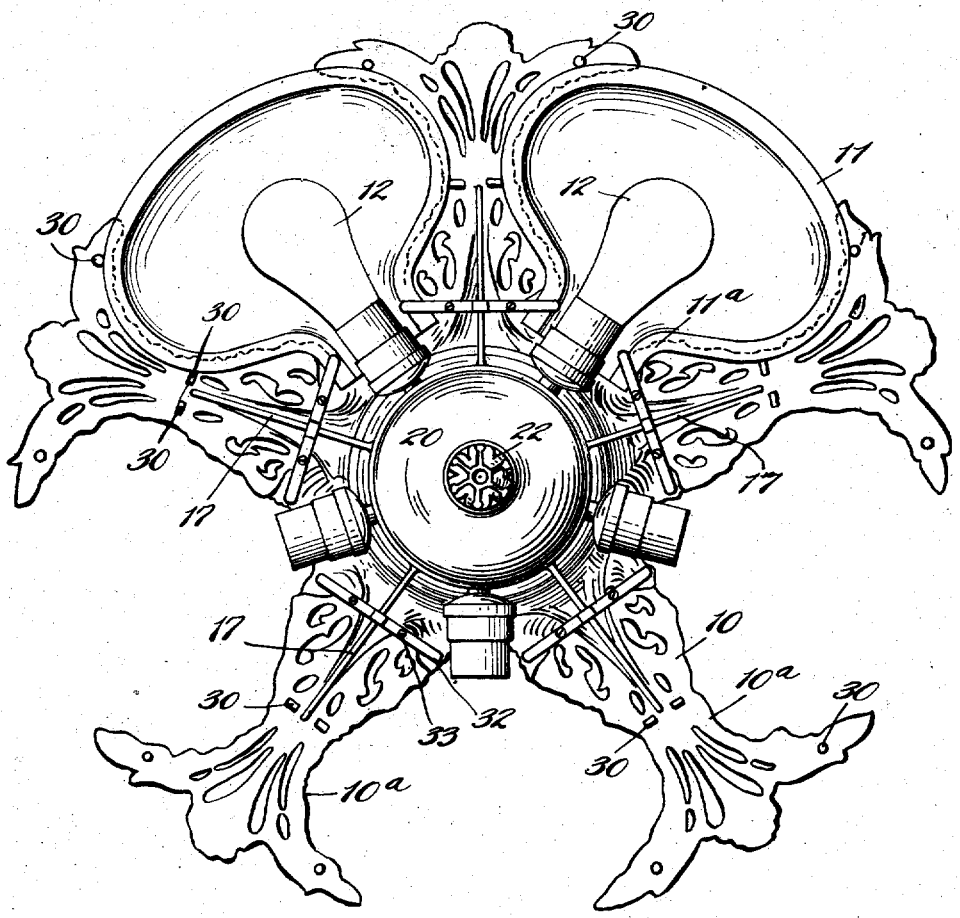
Figure 4:
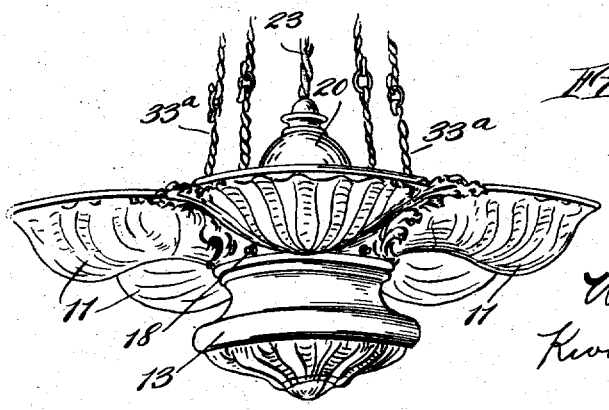
Figure 5:
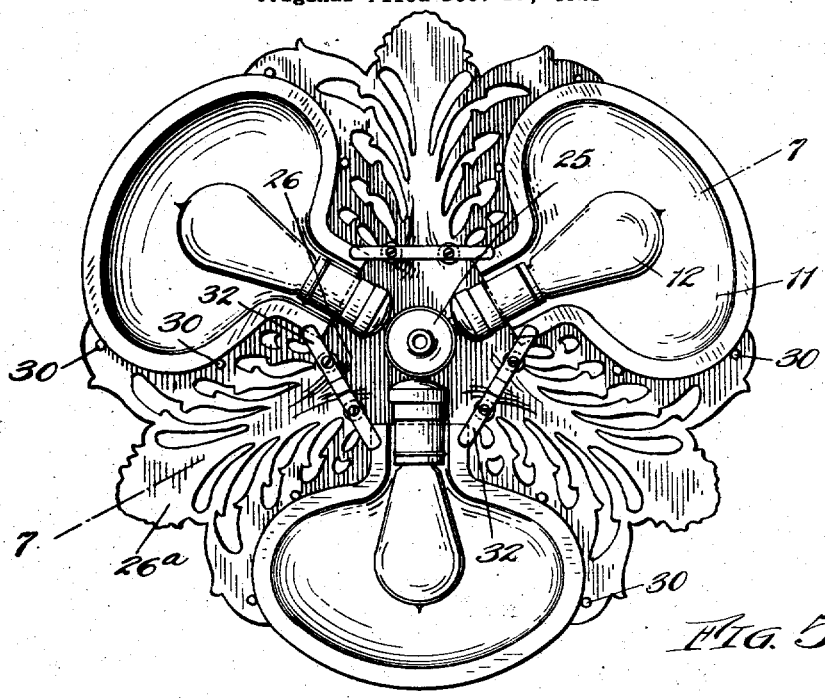
Figure 6:
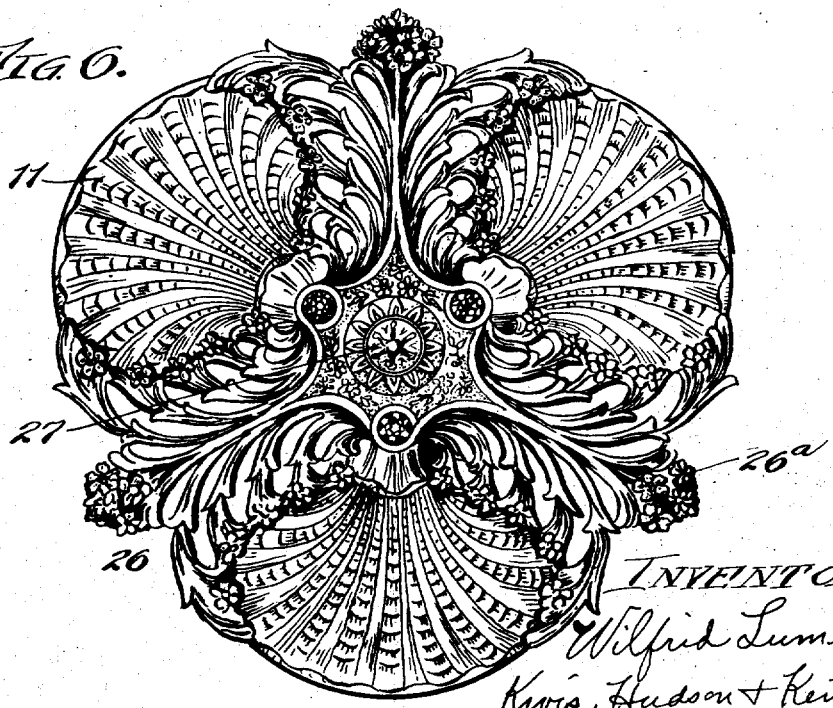
Figure 7:
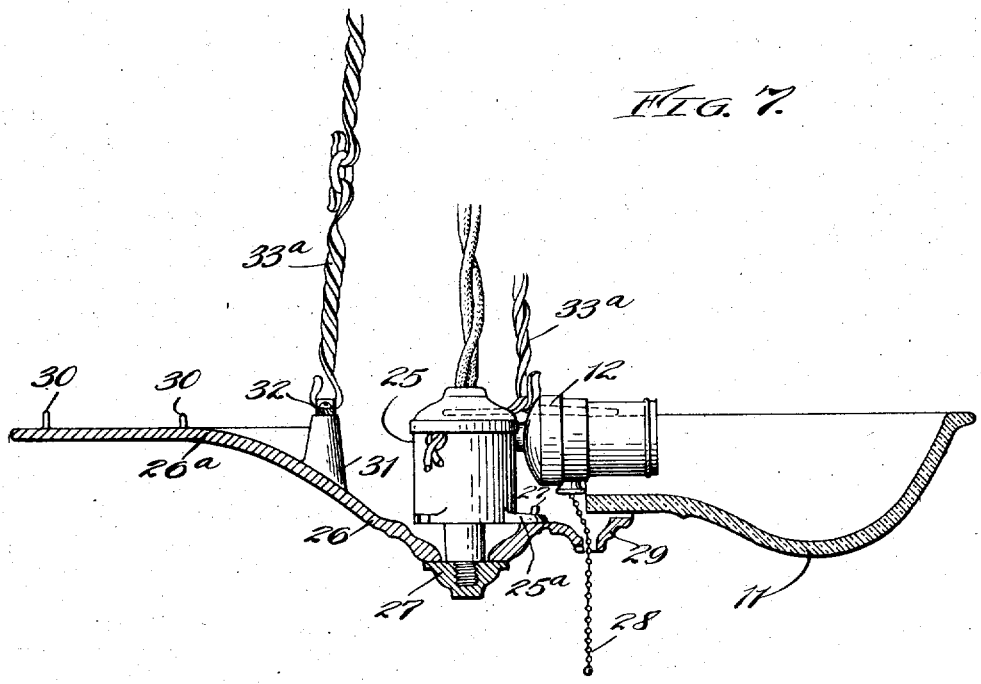
Figure 8:
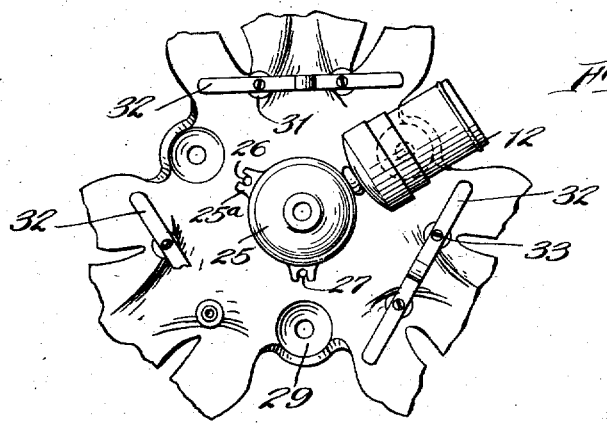

In the accompanying sheets of drawings wherein I have shown two embodiments of the invention, Fig. 1 is a view looking toward the bottom of the fixture as the same is viewed from beneath, which fixture is adapted to be supported from the ceiling, part of a lower central globe of the fixture being broken away; Fig. 2 is a sectional view substantially along the line 2—2 of Fig. 1; Fig. 3 is a top plan view of the fixture of Figs. 1 and 2 with part of the indirect lighting globes and lamps removed; Fig. 4 is a perspective view of this fixture on a reduced scale illustrating the manner in which it may be supported from above; Fig. 5 is a top plan view and Fig. 6 is a bottom view showing a modification; Fig. 7 is a sectional view on an enlarged scale substantially along the line 7—7 of Fig. 5; and Fig. 8 is a top plan fragmentary view of the central part of the fixture of Figs. 5, 6 and 7.

Referring now to the form of the invention shown in Figs. 1 to 4, it will be observed that the fixture includes a frame 10, preferably but not necessarily formed of metal, and provided with outstanding arms $10^a$, most clearly illustrated in Fig. 3. Supported by and between these arms are the indirect lighting globes 11, preferably formed of translucent glass and ornamented in any suitable manner. These globes which are bowl-shaped and face upwardly, enclose or partially surround lamps 12 which project outwardly from the central part of the frame through reduced neck portions $11^a$ of the globes.

One of the improvements of the present invention consists in the provision of what may be termed a direct lighting lamp and globe at the center of the fixture. This globe is shown at 13 and is preferably formed of glass of a translucent nature, so as to give a diffused light. This globe partially encloses a lamp 14. The light emitted by this lamp is transmitted through the globe 13 in a direct manner as distinguished from the indirect method of lighting brought about by the lamps 12 and the upwardly facing reflectors 11, which while transmitting in a direct manner some of the light from the lamps 12, reflect upwardly the major portion thereof.

To admit of the use of the lower central globe 13 and lamp 14 as described, the frame is provided with a central opening slightly larger than the neck of the globe 13, and the distributor for the lamps 12 is in the form of an annulus 16 arranged centrally of the fixture and in the form of an upstanding flange. This annulus to which the socketed portions of the lamps 12 are attached, as best shown in Fig. 2, may be part of the casting of which the frame 10 is formed, or it may be a separate part attached thereto. I have produced very effective results by forming this annulus of spun sheet metal which is set into the central enlarged opening of the frame 10, and is soldered to the latter. In the event the annulus 16 constituting the support or distributor for the lamps 12 is formed of sheet metal, I may, if desired, provide braces such as shown at 17, and consisting of rods which extend from the upper part of the annulus outwardly along the arms $10^a$ and at its ends attach to the arms and annulus by soldering or otherwise. Other suitable bracing means may be employed if desired, and if found necessary.

This construction provides at the central part of the frame 10 an opening into which the neck of the globe 13 extends, and in which it may be held by set screws 18 or equivalent means, one of the set screws being shown in Fig. 2.

Inside the annulus 16 there is fitted and secured by soldering or otherwise, a reflector 19, and surrounding this reflector there is a dome 20, the exterior of which may be ornamented to add to the attractiveness of the fixture as a whole. The top of the reflector has an opening through which the lamp 14 extends, and the socket of this lamp is secured to a member 21 attached to the top of the dome by a fastening member 22. As here shown the parts 21 and 22 are screwed together and clamp between them the top of the dome 20. The top member 22 has an opening extending down through it to accommodate the electric conductors 23 by which current is supplied to the central lamp 14 and to the radially disposed lamps 12, the current supplying conductors extending to the lamps 12 being located between the reflector 19 and the dome 20, and therefore concealed from view. Preferably the top of the dome 20 is perforated as shown at 24, to provide for the escape of heat generated by the lamp 14.

The fixture shown in Figs. 1 to 4 has five of the indirect lighting globes 11, and consequently five of the lamps 12, the rays from which are transmitted and reflected, by the globes 11, whereas the fixture shown in Figs. 5 to 8 has simply three of the globes 11 which partially surround lamps 12 whose sockets are supported from a much smaller distributor shown at 25, and supported by the central part of the metal frame, here designated 26, and having as before, outstanding arms 26ª on the adjacent marginal portions of which the globes or reflectors 11 are supported.

The fixture shown in Figs. 5 to 8 is not provided with the lower central globe 13, and therefore the central part of the frame is substantially solid instead of being provided with the fairly large central opening to accommodate the globe 13 of Figs. 1 to 4. It will be observed that in this instance the distributor 25 is secured to the central part of the frame 26 by a nut 27 screwed onto a threaded shank at the bottom of the distributor. This nut 27 forms in effect the lower central part of the frame 26, and is preferably ornamented to conform therewith. Preferably the distributor 25 is definitely positioned so that the lamps 12 will extend out centrally between the arms 26ª of the frame, and in this instance this is brought about by providing at the lower part of the body of the distributor 25, forks or bifurcations 25ª which engage upstanding pins 27 on the frame 26, (see Figs. 7 and 8).

If desired, all the lamps 12 of either of the fixtures herein shown may be controlled by a wall switch, or if desired, the lamps may be controlled individually by switches embodied in the lamps and operated by pull chains 28, which as shown in Fig. 7 may be extended through small openings 29 in the lower part of the frame 26.

In addition to the novel features above explained, which are more or less individual to the two lamp fixtures shown in Figs. 1 to 4 and 5 to 8, respectively, both these lamp fixtures have common features which are novel. One of these features resides in the means for centering the indirect lighting globes 11 between the arms of the frame. This consists of a series of integral pins or lugs 30 shown in Figs. 2 and 3 and in Figs. 5 and 7. These pins project upwardly from and are carried by the arms 10ª and 26ª of the frames 10 and 26 respectively, near the margins of the arms. They are so located that they engage the marginal flanges of the reflectors 11, and thus hold the latter in place. On the other hand, they do not interfere with the removal of the reflectors inasmuch as it is only necessary to lift the marginal portions of the reflectors above the pins and then move the reflectors radially outward from between the arms.

The second feature common to both fixtures herein illustrated, resides in the means by which the reflectors are supported. For the support of the fixtures, the frame 10 in one instance (Figs. 1 to 4) and the frame 26 in the other instance (Figs. 5 to 8) are provided with upstanding lugs or posts 31 which are carried by and project upwardly from the inner portions of the arms 10ª or 26ª, the posts being on opposite sides of the center lines of the arms. To the upper ends of each pair of posts 31, a cross strap 32 is secured by fastening devices such as screws 33. These are clearly shown in Figs. 2, 3, 5 and 7.

The center portions of the straps are preferably bowed upwardly, and to these center portions the fixture supporting devices 33ª (see Figs. 4 and 7) are hooked or otherwise connected.

It will thus be seen that I have provided certain important improvements in lamp fixtures and while I have shown sumply two forms of the invention, I do not desire to be confined to the precise details shown, but aim to cover all modifications which do not involve a departure from the spirit and scope of my invention as set forth in the appended claims.

Having described my invention, I claim:

1. A lighting fixture composed of a frame having outstanding arms, lamps projecting outwardly between the arms, upwardly facing reflectors, individual to the different lamps and supported between the arms, said arms having near their margins upstanding portions for centering the reflectors.

2. An indirect lighting fixture comprising a frame with outstanding arms, lamps supported by the frame and projecting out between the arms, upwardly facing reflectors, individual to the different lamps and located between the arms, and means for supporting the fixture from above, comprising posts extending up from the frame, and cross-pieces secured to said posts.

3. A lighting fixture comprising a frame having a central opening at the bottom, and having a lamp located centrally thereof, a direct lighting globe beneath said lamp and secured in said central opening, a plurality of lamps projecting outwardly from the frame outside the central opening, and a plurality of translucent indirect lighting globes individual to the different lamps and enclosing the same and supported independently thereof.

4. A lighting fixture comprising a frame having a central opening and an annular upstanding member surrounding said opening, a plurality of substantially radial lamps supported by said member, upwardly facing indirect lighting globes individual to said lamps, a central lamp, and a direct lighting globe supported by the frame and secured centrally of the frame to said annular member and enclosing said lamp.

5. A combined indirect and direct lighting fixture comprising a frame having a central opening and an upstanding annular member, a lamp arranged centrally of said opening and member, means secured to said member for supporting the lamp, a central lower globe enclosing said lamp, a plurality of substantially radially disposed lamps projecting from said member, and a plurality of upwardly facing indirect lighting globes supported by the frame in a substantially radial manner outside said central globe and enclosing said last mentioned lamps.

6. An indirect lighting fixture comprising a frame having a plurality of outwardly extending arms and lamps extending from the center of the frame between the arms, and a plurality of upwardly facing reflectors detachably supported by the arms for removal independently of the lamps, each reflector being individual to a lamp.

7. An indirect lighting fixture comprising a frame having outstanding arms and having at the center a plurality of lamps projecting outwardly between the arms, and an upwardly facing bowl-shaped reflector for each lamp each reflector being supported between a pair of arms.

8. An indirect lighting fixture comprising a frame having outstanding arms and having at the center a plurality of lamps projecting outwardly between the arms, and an upwardly facing bowl-shaped reflector for each lamp each reflector being supported between a pair of arms, and each reflector having a reduced neck portion adjacent the inner portions of the arms and through which the lamp extends.

9. An indirect lighting fixture adapted to be supported from the ceiling comprising an ornamental frame having a central lamp supporting portion and a plurality of outstanding arms forming spaces between them, a plurality of separate bowl-shaped upwardly facing reflectors extending between and connected to the adjacent portions of adjacent arms.

10. An indirect lighting fixture comprising a supporting frame having a central portion and outstanding arms, and a plurality of separate upwardly facing bowl-shaped reflectors located between adjacent arms and having portions engaging the marginal portions thereof.

11. An indirect lighting fixture comprising a supporting frame having a central portion and outstanding arms, and a plurality of separate upwardly facing bowl-shaped reflectors located between adjacent arms and having portions engaging the marginal portions thereof, and said reflectors having reduced inner neck portions.

In testimony whereof I hereunto affix my signature.

WILFRID LUMLEY.